United States Patent
Cohen (10) Patent No.: US 6,169,969 B1
(45) Date of Patent: Jan. 2, 2001

(54) DEVICE AND METHOD FOR FULL-TEXT LARGE-DICTIONARY STRING MATCHING USING N-GRAM HASHING

(75) Inventor: Jonathan Drew Cohen, Hanover, MD (US)

(73) Assignee: The United States of America as represented by the Director of the National Security Agency, Washington, DC (US)

(*) Notice: Under 35 U.S.C. 154(b), the term of this patent shall be extended for 0 days.

(21) Appl. No.: 09/247,318

(22) Filed: Feb. 10, 1999

Related U.S. Application Data (60) Provisional application No. 60/095,649, filed on Aug. 7, 1998.

(51) Int. Cl.[7] .............................. G06F 17/21; G06F 17/20
(52) U.S. Cl. .................................. 704/10; 704/1; 707/531
(58) Field of Search ..................... 704/1, 9, 10; 707/530, 707/531, 532, 1, 3, 100

(56) References Cited

U.S. PATENT DOCUMENTS

| | | | |
|---|---|---|---|
| 5,276,641 | * 1/1994 | Aragon | 382/40 |
| 5,418,951 | * 5/1995 | Damashek | 704/9 |
| 5,532,694 | * 7/1996 | Mayers et al. | 341/67 |
| 5,706,365 | * 1/1998 | Rangarajan et al. | 707/102 |
| 5,752,051 | * 5/1998 | Cohen | 704/9 |
| 5,943,443 | * 8/1999 | Itonori et al. | 382/225 |
| 5,946,648 | * 8/1999 | Halstead, Jr. et al. | 704/9 |
| 5,963,965 | * 10/1999 | Vogel | 707/501 |
| 5,991,714 | * 11/1999 | Shaner | 704/9 |
| 6,038,527 | * 3/2000 | Renz | 704/9 |

OTHER PUBLICATIONS

Bloom, B.H., "Space/Time Trade–offs in Hash Coding with Allowable Errors", Communications of the ACM, vol. 13, No. 7, 1970, pp. 422–426.

Karp, R.M. & Rabin, M.O., "Efficient Randomized Pattern––Matching Algorithms", IBM Journal of Research and Development, vol. 31, No. 2, 1987, pp. 249–260.

Amir, A., Farach, M., & Matias, Y., "Efficient Randomized Dictionary Matching Algorithms ", Lecture Notes in Computer Science, vol. 644, 1992, pp. 262–275.

Pryor, D., Thistle, M., & Shirazi, N., "Text Searching On Splash 2 ", Proceedings of the IEEE Workshop on PRGAs for Custom Computing Machines, Los Alamitos, CA, IEEE Computer Soc. Press, 1993, pp. 172–177.

Cohen, J.D., "Recurisive Hashing Functions for N–grams", ACM Transactions on Information Systems, vol. 15, No. 3, Jul. 1997, pp. 291–320.

\* cited by examiner

*Primary Examiner*—Forester W. Isen
*Assistant Examiner*—Patrick N. Edouard
(74) *Attorney, Agent, or Firm*—Stephen M. Bloor (57) ABSTRACT

A method and apparatus providing full-text scanning for matches in a large dictionary is described. The invention is suitable for SDI (selective dissemination of information) systems, accommodating large dictionaries ($10^4$ to $10^5$ entries) and rapid processing. A preferred embodiment employs a hardware primary test on a single commercially-available gate-array board hosted by a computer, in which a software secondary test is conducted. No delimiter cues such as spaces or punctuation are required.

8 Claims, 9 Drawing Sheets

DEVICE AND METHOD FOR FULL-TEXT LARGE-DICTIONARY STRING MATCHING USING N-GRAM HASHING

This application claims the benefit of U.S. Provisional Application No. 60/095,649, filed Aug. 7, 1998.

FIELD OF THE INVENTION

This invention relates to the fields of text processing and selective dissemination of information (SDI), and specifically to the field of rapid and massive string matching.

BACKGROUND OF THE INVENTION

The flood of newsgroup postings, broadcast e-mail, and other electronic documents has necessitated a revived interest in SDI (selective dissemination of information) systems, in which constantly-changing document collections are run against a relatively static body of queries, with the purpose of selecting documents of interest and routing them to subscribers. This body of queries, representing subscriber "profiles" of interest, specifies combinations of patterns or "keywords" that must be found in the documents for selection to take place.

The work of selecting and routing documents naturally separates into two processes: keyword scanning and query resolution. The latter process takes the keyword scanning output and looks for satisfaction of subscriber profiles, labeling successful documents with the appropriate information for subsequent routing. The former concerns itself with locating all keyword occurrences in the documents, and is the primary object of my invention.

In advance of processing any text, words of interest are compiled in a "dictionary." Each text sample is then processed by consulting the dictionary, looking for matches between dictionary words and substrings of the text. More generally, one can process arbitrary byte streams not confined to text, and the dictionary may contain arbitrary entries as well. For simplicity, these arbitrary dictionary entries are termed "keywords," though they may not be words in the usual sense. For practical SDI systems, dictionaries need to accommodate tens of thousands to hundreds of thousands of keywords. The scanning is to be performed at current digital data rates—on the order of tens of megabytes per second or more.

One may consider two common problems: the delimited match problem and the undelimited match problem. In the delimited match case, one insists that a match is only recognized in the sample when the keyword is flanked by delimiters. This is the situation, for example, when only whole words in English are recognized, taking spaces and punctuation as delimiters. A more realistic and difficult problem is the undelimited case, when such cues are not assumed, so that matches can be found anywhere. Undelimited searching permits detection of substrings, operation in languages that lack word delimiters (such as Japanese and Chinese), and general processing on byte streams that are not strictly text. Undelimited matching, required of my invention, is a generalization of delimited matching, since one can certainly test for delimiters after a putative match is found.

Early applicable work was done by Bloom: "Space/Time Trade-offs in Hash Coding with Allowable Errors," *Communications of the ACM*, Vol. 13, No. 7, 1970, pp. 422–426. Given a dictionary of keywords $\{K_i\}$, i=1, d and a set of discrete samples $\{S_i\}$, i=1, N, Bloom disclosed a software method of determining whether a given sample was present in the dictionary. Bloom suggested a two-test approach in which the first test screens out most of the candidate matches, leaving a second test to remove the false hits. In one of his proposals, a hash table contains only binary entries, with an entry holding a one if any keyword hashes to that location, zero otherwise. Sample $S_j$ is tested indirectly through a hash function by calculating $H(S_j)$; if the table bin at this address holds a one, the sample passes the first test and goes on to the second test, in which a full comparison is made. Given a sample not in the dictionary, the probability of a false match in the first test is roughly the fraction of the table occupied by ones. Bloom recognized that the false alarm rate could be improved, up to a point, by applying multiple hash functions to the keywords and samples, addressing into the same binary table: In this scheme, m hash functions $H_1, H_2, \ldots, H_m$ are identified. For each keyword $K_i$, the table locations at positions $H_1(K_i)$, $H_2(K_i), \ldots, H_m(K_i)$ are set. To test a sample $S_j$, the bits in table locations $H_1(S_j), H_2(S_j), \ldots, H_m(S_j)$ are tested. If all of them are set, the sample passes the first test. Bloom does not address the processing of continuous byte streams.

Pryor et al., in "Text Searching On Splash 2," *Proceedings of the IEEE Workshop on FPGAs for Custom Computing Machines*, 1993, pp. 172–177, disclosed an apparatus that embodied and extended the teachings of Bloom, capable of locating delimited strings in continuous bytes streams. In their apparatus, the sample byte stream to be processed feeds parallel hashers, each of which generates addresses for an associated memory. These memories serve as hash tables, and contain entries of one bit each. The outputs from the memories feed a single AND gate, whose output serves as the alarm for a primary test. In advance of operation, the jth memory has been loaded with ones at the locations $\{H_j(K_i) | i=1, \ldots, d \}$; the remaining entries are zero. In operation, when a delimiter is encountered in the stream, the hashers are reset. The bytes after the delimiter enter the hashers, which accumulate the hash function calculations. When the terminating delimiter is located, the hasher outputs are complete and the memory outputs are enabled, so that the memories are polled at the locations specified by the accumulated hash values. If the delimited word just read is a keyword, each of the hash tables will have a one in the specified location, and the AND gate will register an alarm. If the sample word is not a keyword, it is unlikely that all m of the specified memory locations will be set, in which case an alarm is averted. Once an alarm is registered, a secondary test verifies the match. The entire primary test apparatus is implemented in a single board employing field-programmable gate arrays to implement the hashers, paired with memories to act as the hash tables. A hosting computer performs secondary testing. The apparatus of Pryor et al. is not capable of detecting undelimited matches.

The software method of Karp and Rabin, "Efficient Randomized Pattern-Matching Algorithms," *IBM Journal of Research and Development*, Vol. 31, No. 2, 1987, pp. 249–260, teaches that single keywords may be located in continuous byte streams without the use of delimiters using recursive n-gram hashing. An n-gram is an n-long sequence of consecutive bytes. Given the n-long keyword K, their method compared K to each n-gram $S_j$ of the sample string through their hashed values: $H_1(K), H_2(K), \ldots, H_m(K)$ were tested against $H_1(S_j), H_2(S_j), \ldots, H_m(S_j)$, respectively. Agreement caused a secondary test to verify the match. An extension of Karp-Rabin for whole dictionaries of keywords was proposed by Amir, et al, "Efficient Randomized Dictionary Matching Algorithms," *Lecture Notes in Computer Science*, Vol. 644, pp. 262–275. Like Bloom, they proposed using a hash table to store the dictionary, though only one hash function was applied. Their method deals with only one length at a time; dictionaries composed of keywords with multiple lengths required multiple passes—one pass for each length. Their method could be implemented in hardware, but requires significant duplication of hardware for each keyword length.

Others have proposed methods and apparatus for matching multiple keywords in continuous byte streams based on finite state automata and on cellular automata. While these approaches do not require delimiters for detection, they present scaling challenges that make them impractical for continuous processing with large dictionaries.

SUMMARY OF THE INVENTION

In consideration of the problems detailed above and the limitations enumerated in the partial solutions thereto, an object of my invention is to provide dictionary string matching that overcomes limitations of the prior art by locating keywords in continuous byte streams without the need for delimiters in said byte streams.

Another object of my invention to accommodate large dictionaries of keywords.

A further object of my invention to accommodate arbitrary byte strings as keywords.

A still further object of my invention to locate keywords rapidly.

Yet another object of my invention to provide embodiments capable of implementation on a single plug-in board hosted by a computer.

In order to attain the objectives described above, according to an aspect of my invention, there is provided a device and method for full-text large-dictionary string matching using n-gram hashing. My invention exploits the observation that keywords can be represented by their constituent n-grams in a practical way. In gross terms, the approach is to factor each keyword into n-grams and to look for those n-grams in the input stream; a coincidence of a keyword's n-grams suggests that the keyword is present and produces a primary alarm. Keyword n-grams are cataloged in binary hash tables; the input sample is examined by hashing each n-gram in turn and checking for matches in the hash tables. The independent hashed comparisons result in a small probability of false alarm. Primary alarms are then screened by a secondary tester to remove remaining false alarms.

For a given dictionary of keywords $\{K_i\}$, i=1, . . . , d, one chooses an n-gram size n and number of hashers m. Given an n-gram g, the jth hasher calculates the hash function $H_j(g)$. Each keyword is represented by m n-grams, each of which is hashed by the appropriate hasher and its presence noted in a binary hash table.

Let an exemplary keyword $K_i$ have length l. It is assumed that the keywords consist of at least n characters (bytes), so that l≧n. The m n-grams are substrings of the keyword and are chosen to be distributed over it. If l=nm, the n-grams may be adjacent nonoverlapping substrings whose union is the keyword. If l≧nm, the n-grams may still be nonoverlapping, but cannot all be adjacent. If l<nm, then some of the n-grams overlap. In the extreme case of l=n, all n-grams are the same. More specifically, the jth n-gram $g_{ij}$ can be chosen to start $\Delta(j,l)$ bytes into the keyword, j=1, 2, . . . , m, where a suitable choice for $\Delta(j,l)$, called an n-gram selection position, is $$\Delta(j, l) = \text{round}\left[\frac{(l-n)(j-1)}{m-1}\right].$$

Other choices of $\Delta(j,l)$ are also suitable. Keyword $K_i$ is then represented by n-grams $\{g_{ij}|j=1, 2, \ldots, m\}$: the jth hash table, made from all d keywords, has 1's (logical true values) at locations $\{H_j(g_{ij})|i=1, 2, \ldots, d\}$, and 0's elsewhere. In operation, my invention examines the sample byte stream $\{s_i\}$ for the presence of these n-grams, by the method outlined below.

More specifically, my invention provides a dictionary string matching method for locating all matches of a keyword dictionary in a sample byte stream, comprising six steps:

The first step further comprises the steps of building m binary-valued hash tables and setting each entry contained therein, called a presense value, to logical false.

The second step, conducted thereafter, comprises the step of choosing, for each distinct length of keywords in the dictionary, m n-gram selection positions.

The third step, conducted thereafter, performs, for each integer i taking values of 1 through d, inclusive, the steps of: determining the length of the ith keyword; extracting m keyword n-grams from the ith keyword beginning at the m n-gram selection positions in the keyword chosen in the second step, respectively; hashing each of the extracted keyword n-grams, producing m keyword hash addresses using m hashing functions; and posting the m keyword n-grams in the m hash tables, performed by registering each of the m keyword n-grams in the corresponding one of the m hash tables by setting one of said presence values therein to the value of true, at the address identified by the corresponding one of the m keyword hash addresses.

The fourth step, conducted thereafter, ceates m presence values streams by performing, for each position in the sample byte stream, n, n+1, n+2, . . . , in order, the steps of extracting from the sample byte stream the sample n-gram consisting of the n consecutive bytes terminating in the byte at that position; computing m sample hash addresses for the sample n-gram, the jth of the sample hash addresses calculated by applying the jth of the m hashing functions; reading m sample presence values from the m hash tables, the jth of the m sample presence values obtained by reading the presence value from the jth of the m hash tables at the address identified by the jth of the m sample hash addresses; and appending those m sample presence values to the m presence values streams, respectively.

The fifth step, generating primary alarms, comprises the step of performing, for each distinct length of the keywords in the dictionary, the steps of: calculating m delaying additively complementary to the m n-gram selection positions, respectively, for the distinct length of the keywords in the dictionary; forming m delayed presence values streams by delaying the m presence values streams by an amount equal to the m delaying amounts, respectively; and applying an alarm sensing method to the m delayed presence values streams, producing a primary alarm only when the alarm sensing method senses the coincidence of true values in each of the m delayed presence values streams.

The sixth and final step comprises applying, for each primary alarm, a secondary testing method, resulting in a match report if verification of the primary alarm holds.

BRIEF DESCRIPTION OF THE DRAWINGS

My invention may be best understood by reading the specification with reference to accompanying figures, in which.

DETAILED DESCRIPTION

Figure 1:
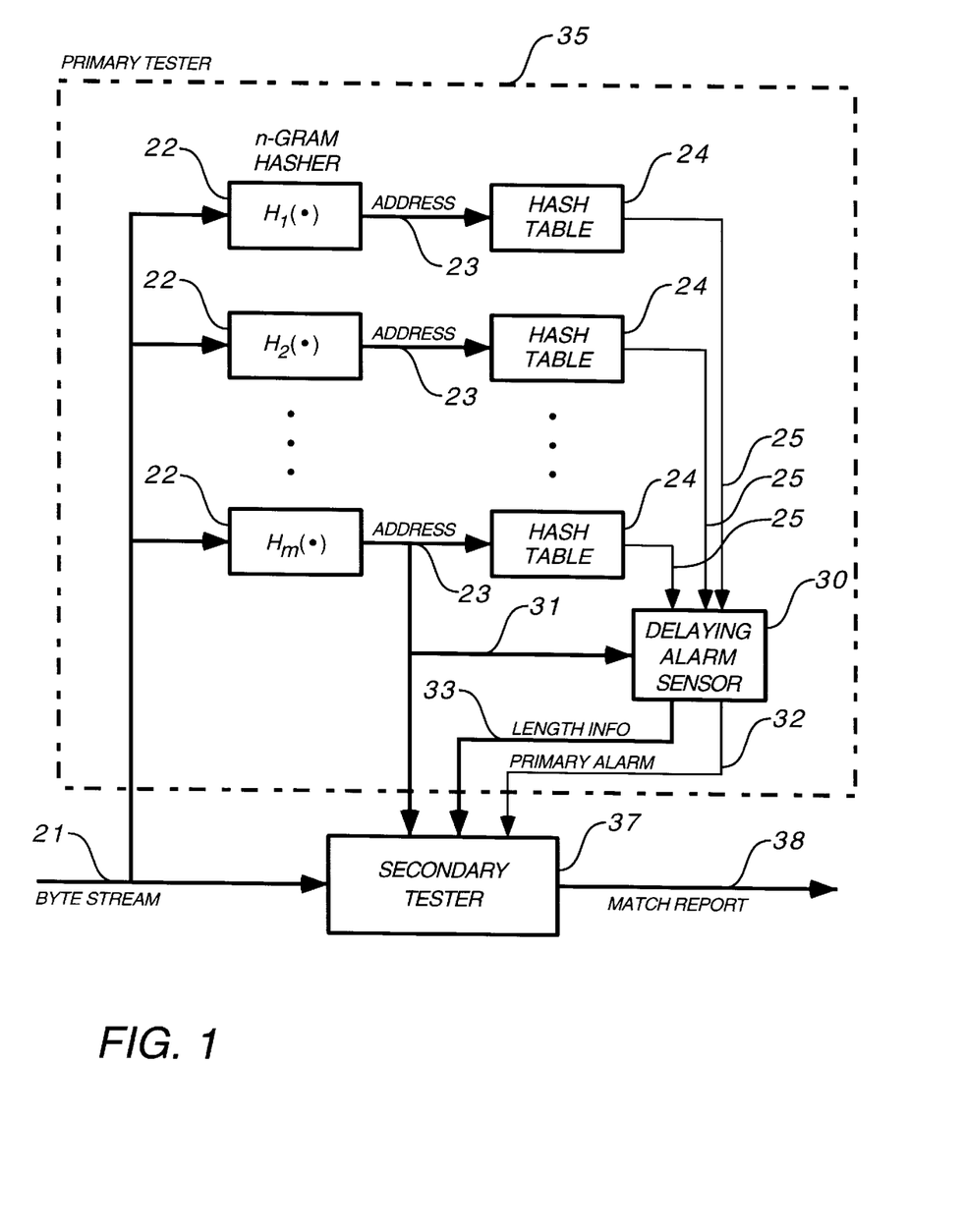
FIG. 1 is a block diagram illustrating the principles of my invention.

A logic diagram illustrating the principles of my invention is shown in FIG. 1, wherein plurality of n-gram hashers 22, plurality of hash address streams 23, plurality of hash tables 24, plurality of binary presence streams 25, delaying alarm sensor 30, and distinguished hash address stream 31 comprise the primary tester 35.

Sample byte stream 21, generated by means not illustrated, is fed to a plurality of n-gram hashers 22. The plurality of n-gram hashers 22 operates upon sample byte stream 21, producing a corresponding plurality of hash address streams 23, each of whose values is determined by the last n bytes in sample byte stream 21. Each one of the plurality of n-gram hashers 22 performs a distinct but similar function, described more precisely hereinbelow. Each address in said plurality of hash address streams 23 is used to address a corresponding hash table in the plurality of hash tables 24, obtaining the single bit recorded at that address and contributing to a binary presence stream in a plurality of binary presence streams 25. The plurality of binary presence streams 25 drives delaying alarm sensor 30. One distinguished hash address stream 31 is arbitrarily chosen from among the plurality of hash address streams 23 to serve to minimize false alarms, as described below.

The presence of a keyword in sample byte stream 21 results in a bit in each of the presence streams in the plurality of binary presence streams 25 taking a true value, but at stream shifts that may not be coincident, owing to the distributed nature of the constituent n-grams in that keyword. It is the job of delaying alarm sensor 30 to recognize such occurrences, with the aid of distinguished hash address stream 31. When delaying alarm sensor 30 recognizes the presence of a complete set of keyword n-grams, it signals a primary alarm 32 and sends auxiliary keyword length information 33 to the secondary tester 37.

Upon receiving primary alarm 32, secondary tester 37 examines sample byte stream 21 for a match at the current location, aided by auxiliary keyword length information 33. If a match is present, a match report 38 results. The secondary tester 37 may employ any means of verifying matches, provided that it is sufficiently fast.

A preferred implementation of n-gram hashing, taught by J. D. Cohen, "Recursive Hashing Functions for n-grams," *ACM Transactions on Information Systems*, Vol. 15, No. 3, July 1997, pp. 291–320, makes use of recursive calculation for speed: to calculate $H(S_i)$, the hash of the ith n-gram $S_i=(s_i, s_{i+1}, \ldots, s_{i+n-1})$ of a byte stream, one may use the previous value $H(S_{i-1})$, the new sample byte $S_{i+n-1}$ and the old sample byte $S_{i-1}$.

Figure 2:
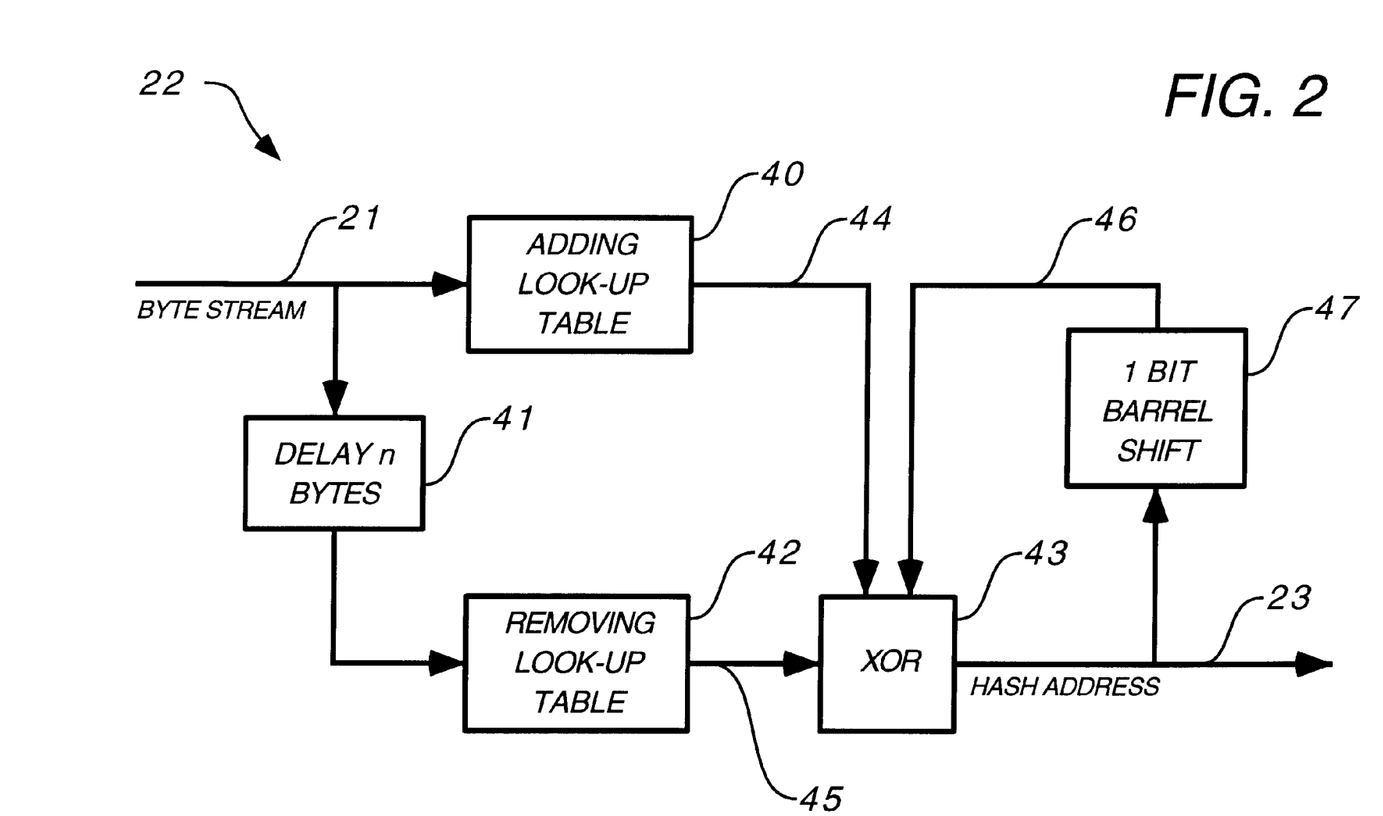
FIG. 2 is a block diagram illustrating one embodiment for recursive hashing.

An implementation of such a method is illustrated in FIG. 2, and can serve as an implementation of each one of the plurality of n-gram hashers 22. Each byte in sample byte stream 21 is used as an address in adding look-up table 40 and, after a delay of n bytes in stream delay means 41, as an address in removing look-up table 42. Each entry of adding look-up table 40 is a random word, that is, each word is chosen independently and uniformly over all possible words. Each entry in removing look-up table 42 is the same as the corresponding entry in adding look-up table 40, except it has been rotated by n bits. Each new hash address contributing to one of the plurality of hash address streams 23, is produced by taking a bit-wise exclusive-OR (XOR) using XOR means 43 of three words: the adding word 44 read from adding look-up table 40 (applying the new byte's contribution), the removing word 45 read from removing look-up table 42 (removing the old byte's contribution) and the delayed word 46 obtained by applying one-bit barrel shift means 47 (1 bit rotation) to the previous hash address contributing to one of the plurality of hash address streams 23.

Those skilled in the art will recognize that the device illustrated in FIG. 2 is suitable for natural embodiment in discrete digital hardware or a preferred embodiment within a single gate array such as an field-programmable gate array (FPGA). Moreover, a single gate array may be sufficient to embody the entirety of the plurality of n-gram hashers 22.

A preferred implementation of the delaying alarm sensor 30 operates according to following principles: Denote the sequence of outputs from the jth hash table, indexed by time t, as $A_j(t)$. A keyword match of length l is indicated when the value of $$I_{l-n}(t) = \prod_{j=1}^{m} A_j[t - ((l-n) - \Delta(j,l))] \tag{1}$$

is 1 (representing a logical true), where $\Delta(j,l)$ is the n-gram selection position used to select the n-grams from the keywords. Note that the delays applied to the hash table outputs are complementary to the corresponding n-gram selection positions and serve to align matches of n-grams taken from different locations in keywords of length l.

Let the index q be chosen from among the indices 1, 2, ... m, with associated hash function $H_q$. During preparation, one may record the lengths of keywords associated with each hash address produced by $H_q$. To reduce the likelihood of a false alarm during operation, one may then restrict alarms to those dictionary lengths that are possible with the current output $H_q(t)$ of the qth hasher. In particular, choose q=m, and let the enabling signal $E_{l-n}(H_m(t))$ be 1 (logical true) if a keyword of length l has been recorded with its last n-gram being hashed to $H_m(t)$. A length alarm that improves the one described in equation (1) is $$L_{l-n}(t) = E_{l-n}(H_m(t))I_{l-n}(t). \tag{2}$$

In implementation, the enabling signals may be bits in words stored in a length-enabling table addressed by $H_m$ of the latest n-gram. When $L_{l-n}(t)$ is a one, the putative keyword's last character was just read. A primary match alarm is noted whenever any one of the individual length alarms $\{L_k\}$ is one.

Figure 3:
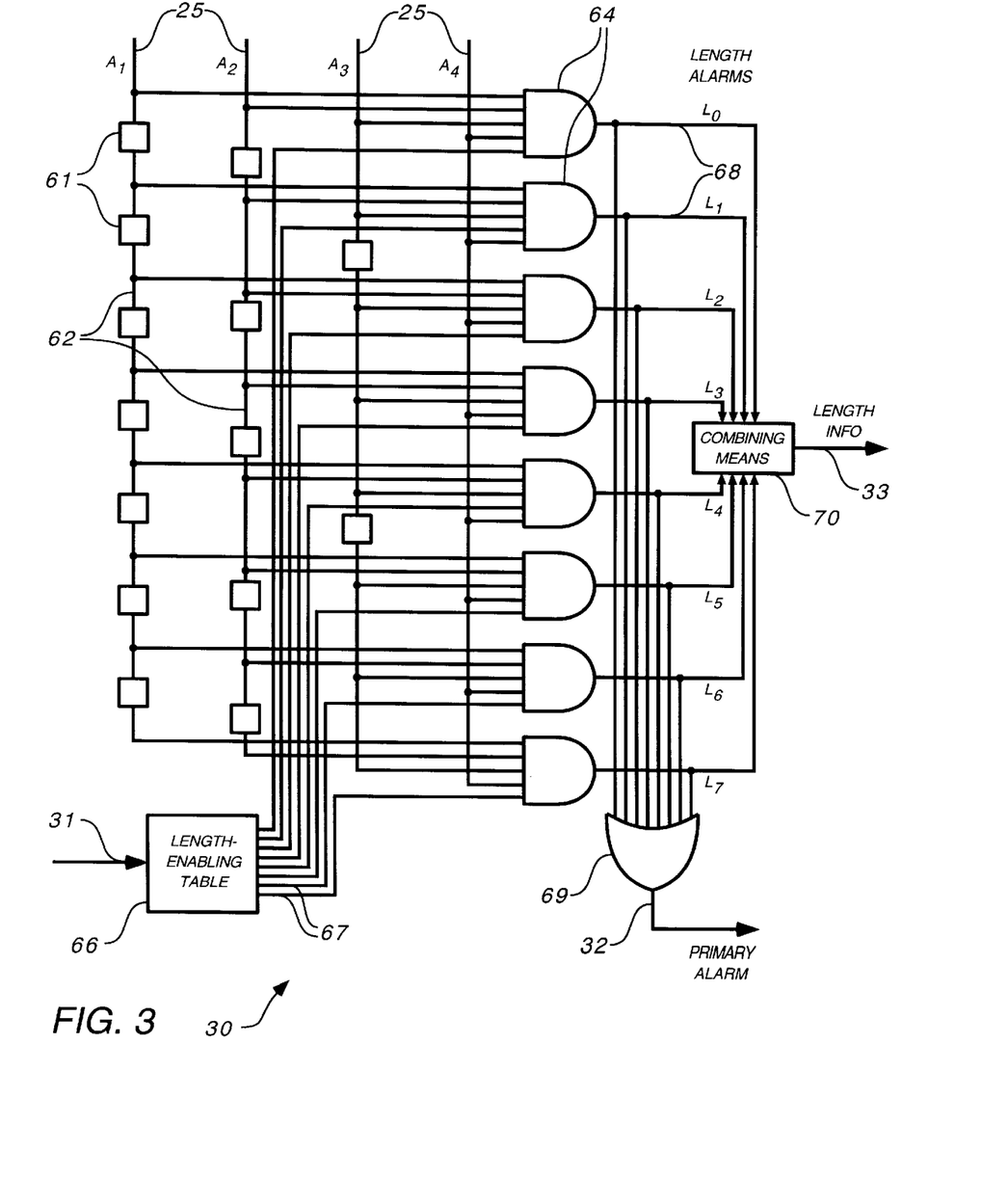
FIG. 3 is a block diagram of an example delaying alarm sensor for 8 keyword lengths.

FIG. 3 illustrates an example embodiment of these principles, showing an implementation of a delaying alarm sensor 30 for 8 keyword lengths, with the choice of q=m, and operating according to equation (2). Plurality of binary presence streams 25, obtained from plurality of hash tables 24, undergo single-bit delays due to array of single-bit delays 61, producing plurality of delayed presence streams 62, with delays according to equation (1). For each keyword length, one of a plurality of AND function means 64 serves to recognize indications of the presence of a keyword of that length by recognizing the coincidence of m members of plurality of delayed presence streams 62 and members of binary presence streams 25 (which are essentially members of plurality of delayed presence streams 62 experiencing zero delay). In addition, distinguished hash address stream 31 addresses a length-enabling table 66, which produces a plurality of length-enabling bit streams 67, one stream for each keyword length. Each one of the plurality of length-enabling bit streams 67 drives one of the plurality of AND function means 64, indicating whether keywords of the corresponding length are possible in light of distinguished hash address stream 31. Each one of the plurality of AND function means 64 produces one of a plurality of length alarms 68; a value of 1 (logical true) in this stream indicates a primary alarm for the corresponding keyword length. Thus, each stream in the plurality of length alarms 68 serves both as a trigger for a primary alarm 32, instigated by OR function means 69, and as alarm length information, reduced by combining means 70 into auxiliary keyword length information 33.

For many applications, combining means 70 may simply be a pass-through, preserving each of its inputs as part of keyword length information 33; for situations in which the number of keyword lengths being examined is larger than a practical word width for keyword length information 33, combining means 70 may serve to reduce the number of bits by making each of its output bits represent multiple lengths.

Those skilled in the art will recognize that the device outlined in FIG. 3 is suitable for natural embodiment in discrete digital hardware or a preferred embodiment within a single gate array such as an FPGA, and that the device can be extended by obvious means to other numbers of keyword lengths.

Figure 4:
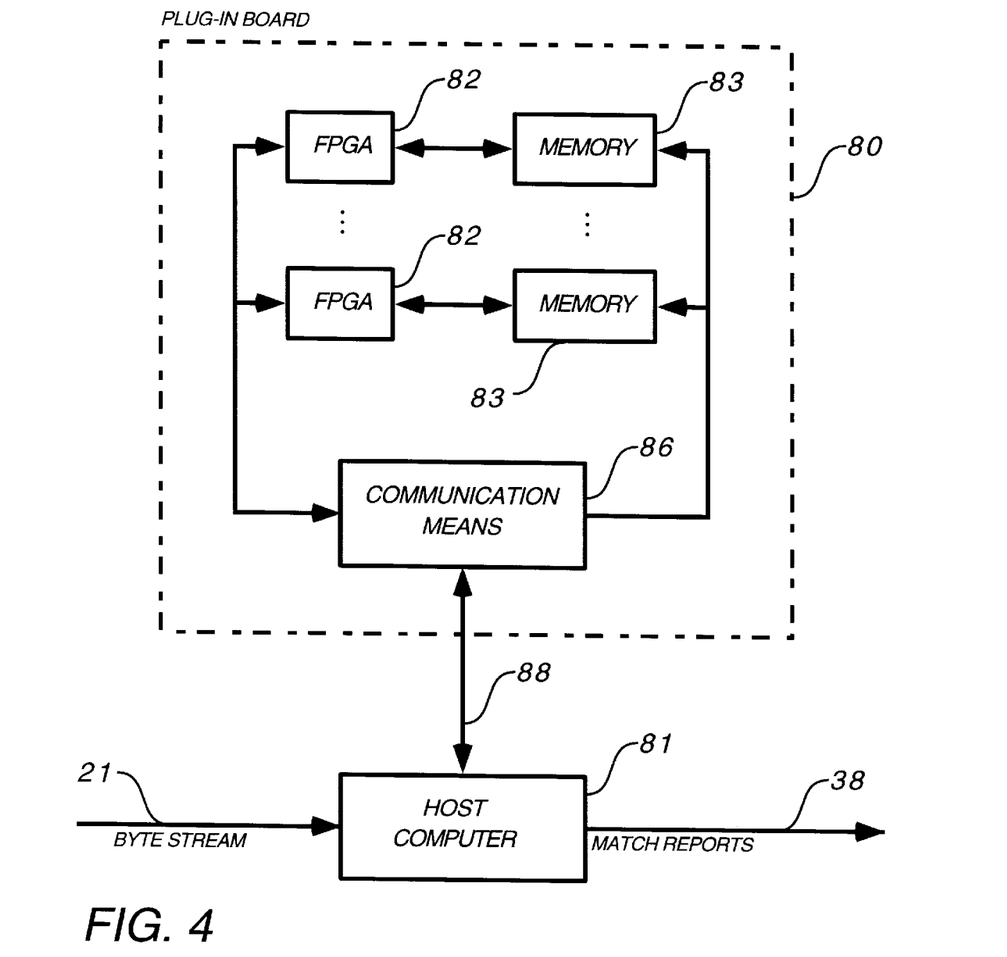
FIG. 4 is an illustration of a preferred embodiment of my invention.

A preferred embodiment of my invention may be constructed as illustrated in FIG. 4, divided into a single plug-in board 80 and a host computer 81. Plug-in board 80 contains a plurality of FPGAs 82, each paired with one of a plurality of memories 83. The plurality of FPGAs embody the primary tester less its plurality of hash tables 24, which are embodied in plurality of memories 83. The plug-in board 80 also contains a communication means 86, which provides linkage and buffering between the plurality of FPGAs 82 and the plurality of memories 83 to a bus 88. Through the communication means 86 and bus 88, the plurality of FPGAs 82 and plurality of memories 83 are programmed by the host computer 81, the plurality of FPGAs 82 are controlled, and primary alarm 32 and auxiliary alarm length information 33 are sent to the host computer 81. Plug-in board 80 may be obtained by configuring any one of a number of existing commercial board products consisting of FPGAs, memories, and communication and control apparatus.

The host computer 81 provides secondary tester 37 via software, provides programming and control of board plug-in board 80, and provides match report 38.

Several alternative embodiments to those in FIG. 4 are obvious: the sample byte stream 21 may be sent directly to the board's communication means 86 without burdening bus 88. The sample byte stream 21 may originate from within host computer 81. Multiple boards may be used when deemed more practical. Only one FPGA, one memory, or one of each may be sufficient.

The descriptions hereinabove illustrate embodiments of my invention that are more generally described by the methods outlined in FIGS. 5 through 9.

Figure 5:
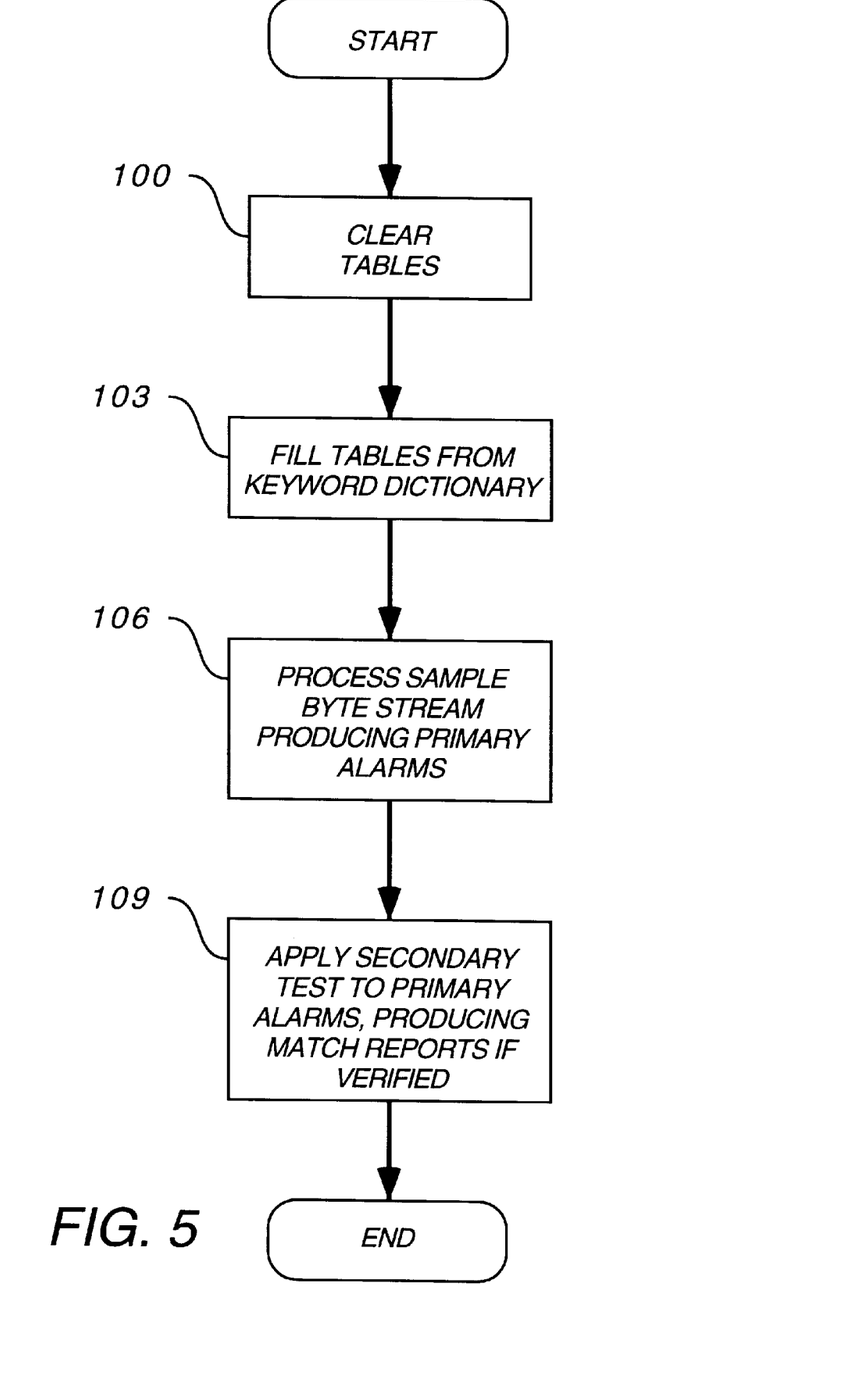
FIG. 5 is a high-level description of a preferred method implementing my invention.
Figure 6:
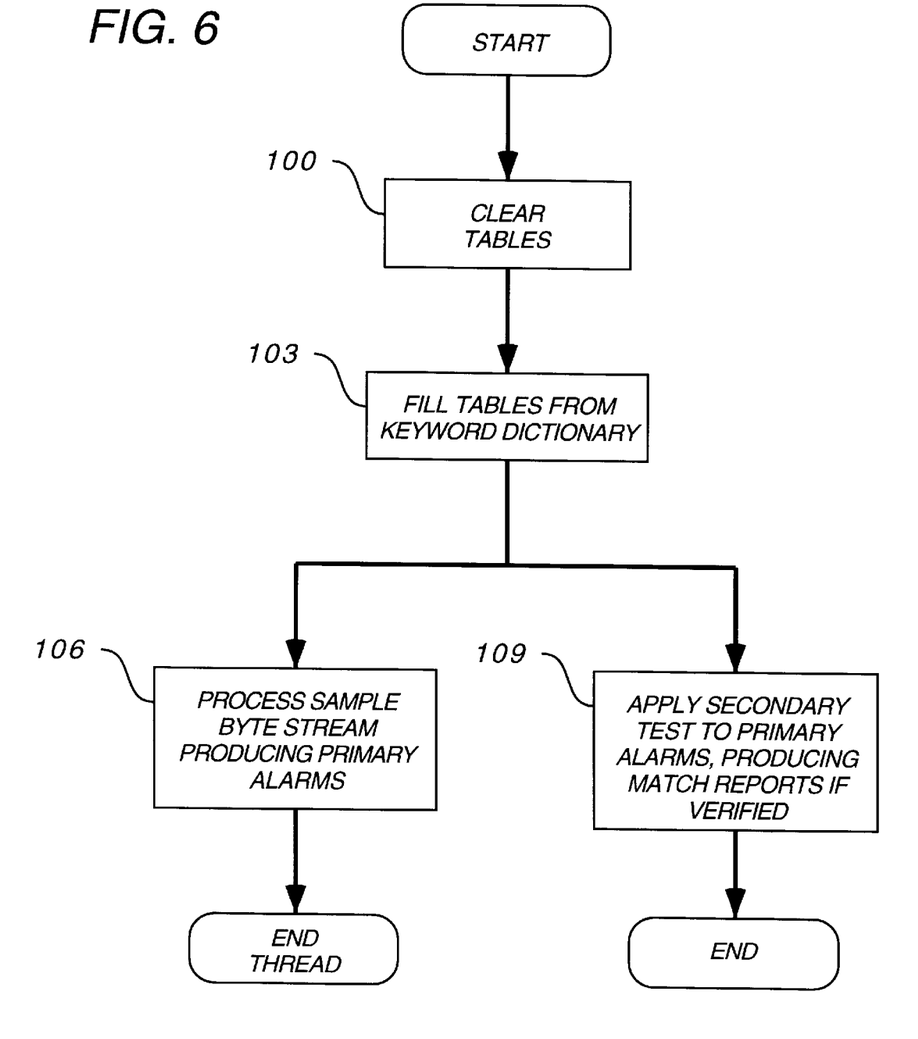
FIG. 6 is an alternative high-level description of a preferred method implementing my invention.

A high-level description of a preferred method is shown in FIG. 5. Initially, tables are cleared (step 100, clear tables). Thereafter, appropriate information about the keywords comprising the keyword dictionary are recorded in the tables (step 103, fill table from keyword dictionary). After this preparatory work, the sample byte stream is processed (step 106, process sample byte stream producing primary alarms), consulting the tables and producing primary alarms. The primary alarms are examined thereafter in step 109 (apply secondary test to primary alarms producing match reports if verified), in which a secondary test examines the sample byte stream in light of the primary alarms, producing match reports when alarms are verified. An alternative high-level description of a preferred method is given in FIG. 6. Here, the steps of processing the sample byte stream (step 106, process sample byte stream producing primary alarms) and applying a secondary test to primary alarms (step 109, apply secondary test to primary alarms producing match reports if verified) are conducted in parallel, with the latter step processing primary alarms as they are made available by the former.

Figure 7:
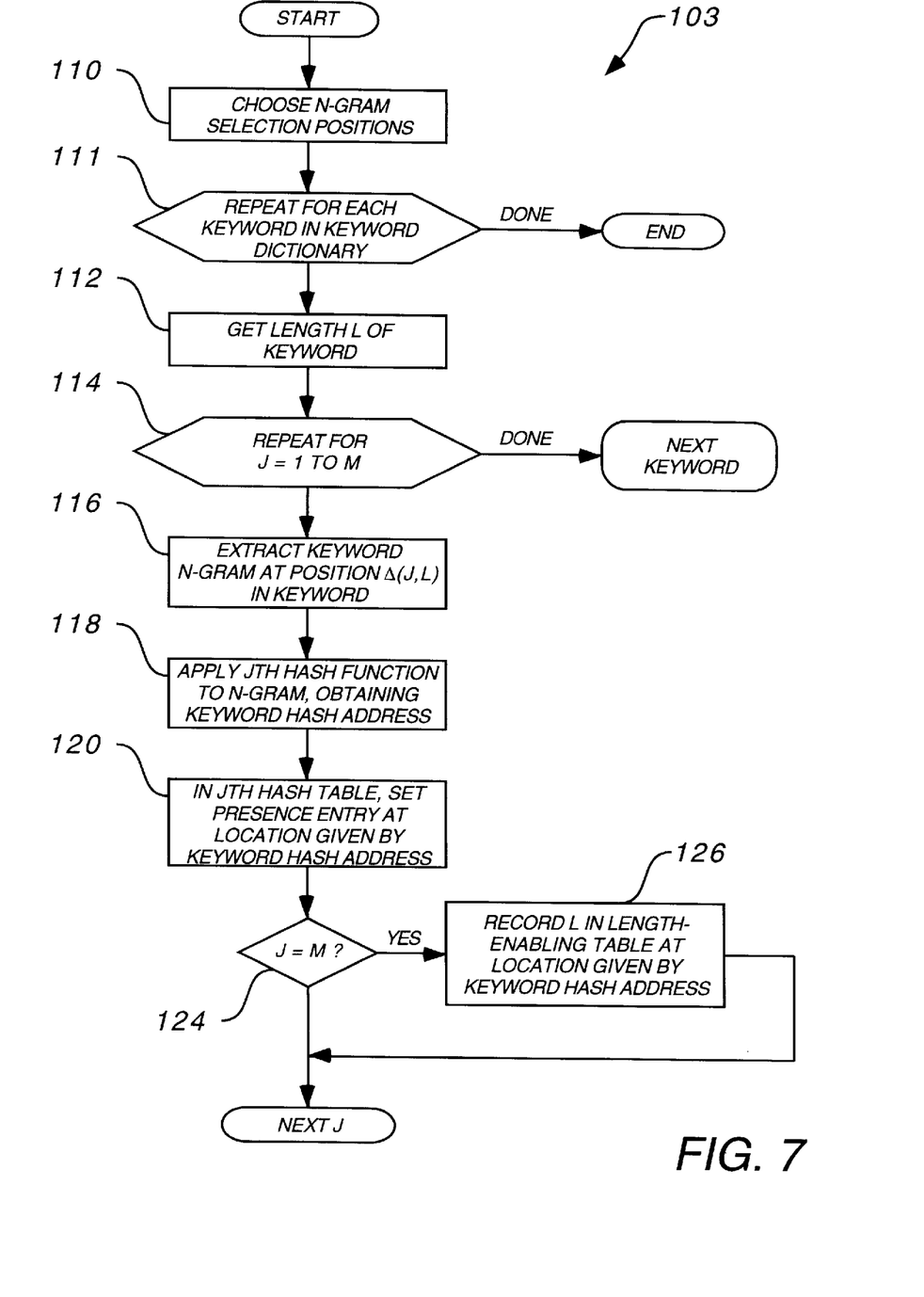
FIG. 7 outlines a preferred implementation of filling tables from the keyword dictionary, step 103.

FIG. 7 outlines a preferred implementation of step 103 (fill table from keyword dictionary). First, step 110 (choose n-gram selection positions) chooses, for each distinct length of keywords in the dictionary, m n-gram selection positions. Thereafter, each of the keywords in the dictionary is examined in turn, owing to keyword loop 111. For each keyword, its length l is noted in step 112. Then a keyword hash index loop (step 114) for index j running from 1 to m, inclusive, is conducted to extract and record m pieces of information about each keyword. In particular, m keyword positions, $\{\Delta(j,l), j=1, 2, \ldots, m\}$, determined for length l in advance, are consulted, and for each value of j, the n-gram in the current keyword that begins at position $\Delta(j,l)$ is extracted (step 116), hashed by applying a predetermined hash function $H_j$ to it (step 118), obtaining a keyword hash address, and that keyword hash address is used to address the jth hash table and set the presence value there to logical true (step 120). Additionally, it is desirable to record information that associates one set of keyword hash address values with keyword length information for false alarm reduction. Recording such information is illustrated here by using the mth keyword hash address (selected by step 124, which tests for j=m) as an address to record information about the current keyword's length in a length-enabling table (step 126).

Figure 8:
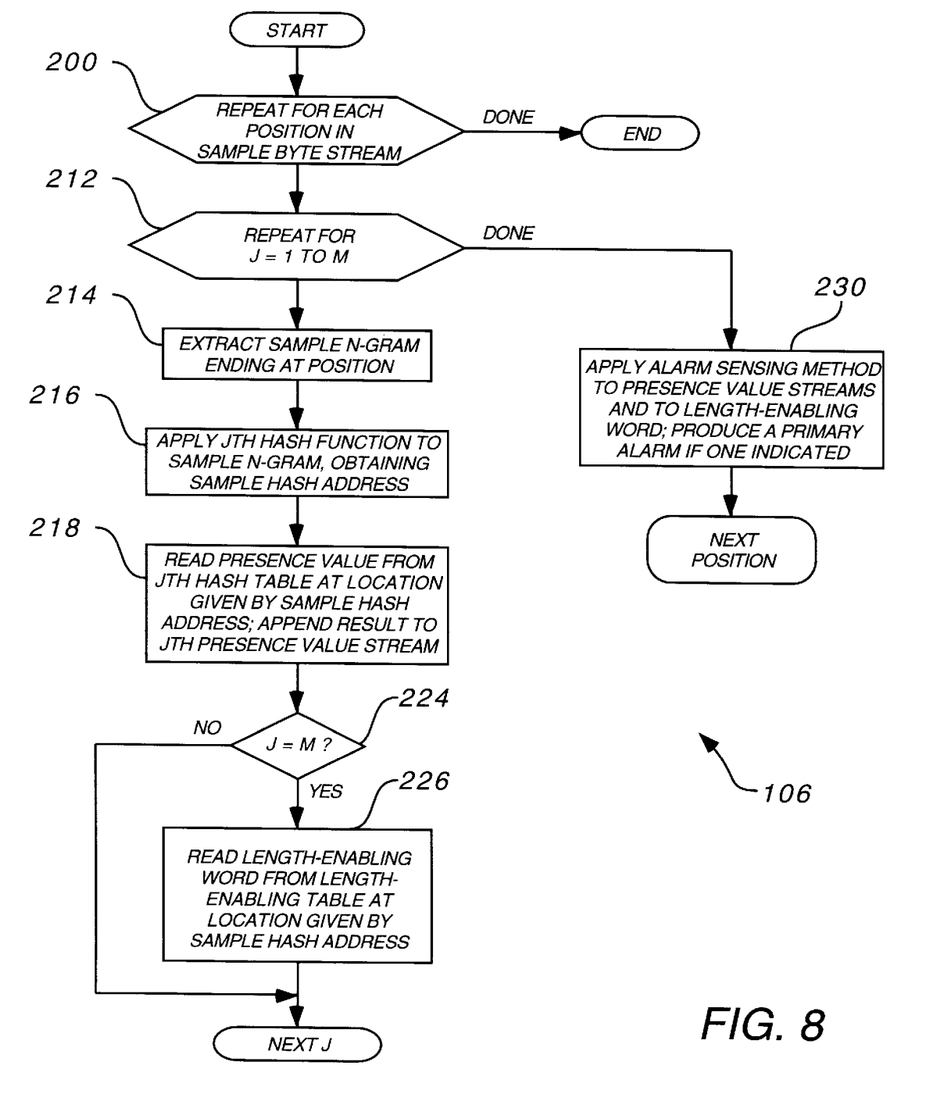
FIG. 8 illustrates a preferred expansion of step 106 (process sample byte stream, producing primary alarms)

FIG. 8 illustrates an expansion of step 106 (process sample byte stream producing primary alarms). At each position of the sample byte stream (sample location loop step 200), information is extracted from the stream in an effort to locate primary alarms. For each current position, m examinations are made, as ensured by sample hash index loop step 212, in which the index j assumes each value of 1 through m, inclusive. For each value of j, the n-gram terminating at the current location is extracted (step 214), and hashed (step 216) using the aforementioned hash function $H_j$, producing a sample hash address. Using this address, the jth hash table is consulted, the presence value there is read, and is appended to the jth of a set of m presence value streams (step 218), thereby forming said presence value stream. For the case of j=m, tested by step 224, the sample hash address is used to extract length information in the form of a length-enabling word, (step 226) about keywords possessing the same mth hash address. When all presence value streams have been updated, step 230 (apply alarm sensing method), amplified in FIG. 9, examines said presence value streams and said length-enabling word to produce a primary alarm, if warranted. It should be understood that although FIG. 8 suggests that each value of j is examined sequentially, implementations in which each value of j is examined in parallel are also desirable. It is only necessary that all values of j be examined before conducting step 230 (apply alarm sensing method). It may also be noted that steps 214 and 216 may be combined and implemented as a recursive hashing operation in the interest of rapid processing.

Figure 9:
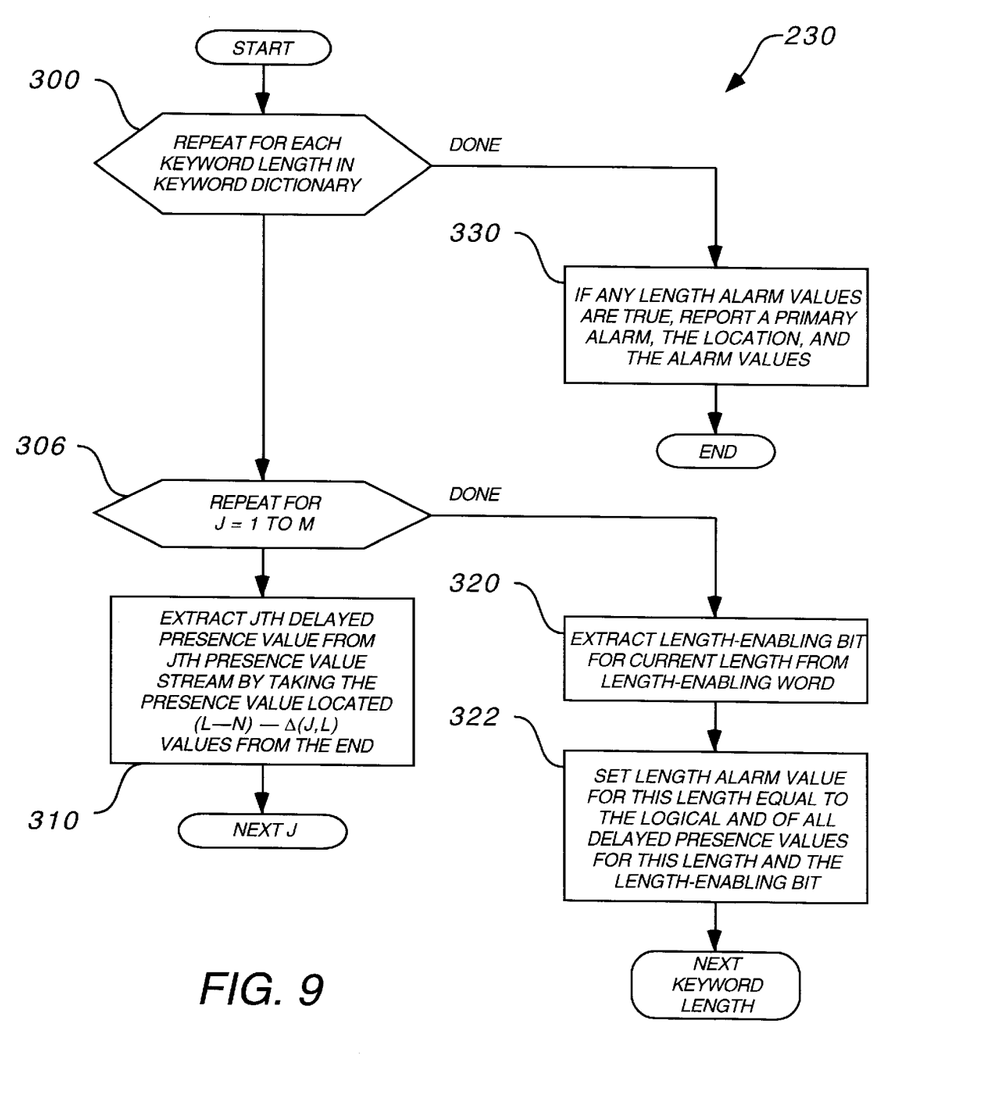
FIG. 9 is a preferred amplification of step 230 (apply alarm sensing method to presence value streams and to length-enabling word; produce a primary alarm if one indicated).

FIG. 9 amplifies step 230 (apply alarm sensing method). For each value of keyword length in the keyword dictionary (keyword length loop step 300), a test is conducted, resulting in a length alarm value, as now described. For each of said keyword lengths, m delayed presence values are extracted, as alarm length loop step 306 causes index j to assume each value of 1 through m, inclusive. For each value of j, the jth presence value stream is examined, and the presence value therein, located $(l-n)-\Delta(j,l)$ entries from the end, is extracted by step 310, forming the jth delayed presence value. A length-enabling bit from the length-enabling word obtained in step 226, corresponding to the keyword length under examination, is extracted in step 320. Step 322 performs a logical AND of said m delayed presence values and of said length-enabling bit, producing a length alarm value for the length under examination. If any of said length alarm values are logically true, step 330 issues a primary alarm, and issues auxiliary information about the alarm, such as position and said length alarm values.

It should be understood that many of the steps of FIG. 9 may be conducted in parallel, rather than the serial conduct suggested by the figure. Indeed, all delayed presence values for a given length may be extracted in parallel (step 310), and in parallel with extracting the length-enabling bit (step 320) for that same length. Moreover, each length examined by keyword length loop 300 may be examined in parallel as well. It should also be noted that the delay applied in step 310, need not be $(l-n)-\Delta(j,l)$, but may be any value that is additively complementary to $\Delta(j,l)$, that is, any value of the form $k-\Delta(j,l)$, for k a constant.

Those skilled in the art will recognize that the descriptions herein have been disclosed for purposes of illustrating my invention, and omit such obvious steps as initialization, buffering, input/output, and table programming, and ancillary apparatus concerned with clocking, buffering, synchronization, input byte stream filtering, programming of memory, power supply, and other support functions. Further, it is understood by those skilled in the art that my invention may take many forms differing from the implementations and embodiments described herein, and I intend that my invention be limited only by the appended claims.

I claim:

1. A dictionary string matching method for locating all matches of a keyword dictionary in a sample byte stream, said keyword dictionary consisting of d keywords, each of said keywords being composed of a sequence of bytes of a general nature, comprising the steps of:
    (a) initializing, comprising the steps of building and clearing m hash tables, said m hash tables being composed of presence values, said presence values being binary entries of logical value, said clearing consisting of the setting the value of each of said binary entries to false;
    (b) thereafter, for each distinct length of keywords in the dictionary, choosing m n-gram selection positions;
    (c) thereafter, for each integer i taking values of 1 through d, inclusive, performing the steps of:
        (i) determining the length of the ith of the keywords;
        (ii) extracting m keyword n-grams from the ith keyword beginning at said m n-gram selection positions in the keyword, respectively;
        (iii) hashing each of said keyword n-grams, producing m keyword hash addresses, each of said keyword hash addresses corresponding to one of said keyword n-grams; said hashing being performed using m hashing functions; and
        (iv) recording, comprising the step of posting said m keyword n-grams in said m hash tables, performed by registering each of said m keyword n-grams in the corresponding one of said m hash tables, said registering within one of said m hash tables being performed by setting one of said presence values therein to the value of true, at the address identified by the corresponding one of said m keyword hash addresses;
    (d) thereafter, creating m presence values streams by performing, for each position in the sample byte stream, n, n+1, n+2, . . . , in order, the steps of:
        (i) extracting from the sample byte stream the sample n-gram consisting of the n consecutive bytes terminating in the byte at said position;
        (ii) computing m sample hash addresses for said sample n-gram, the jth of said sample hash addresses calculated by applying to said sample n-gram the jth of said m hashing functions;
        (iii) reading m sample presence values from said m hash tables, the jth of said m sample presence values obtained by reading the value from the jth of said m hash tables at the address identified by the jth of said m sample hash addresses; and
        (iv) appending said m sample presence values to said m presence values streams by appending the jth of said m sample presence values to the jth of said m presence values streams;
    (e) generating primary alarms, by performing, for each distinct length of the keywords in the dictionary, the steps of:
        (i) calculating m delaying amounts, the jth of said m delaying amounts being additively complementary to the jth of said m n-gram selection positions for said distinct length of the keywords in the dictionary;
        (i) forming m delayed presence values streams according to said m delaying amounts, the jth of said m delayed presence values streams being produced by delaying the jth of said m presence values streams by an amount equal to the jth of said m delaying amounts; and
        (ii) applying an alarm sensing method to said m delayed presence values streams, producing one of said primary alarms only when said alarm sensing method senses the coincidence of true values in each of said m delayed presence values streams; and
    (f) for each of said primary alarms, applying a secondary testing method to verify said primary alarm, resulting in a match report if verification holds.

2. A dictionary string matching method according to claim 1, wherein:

(a) said step of initializing also includes the steps of:
   (i) building and clearing a length-enabling table, said length-enabling table consisting of logical words; and
   (ii) choosing a length-recording index from among the integers 1 through m, inclusive;
(b) said step of recording further comprises the additional step of posting information about the length of the ith of the keywords, said step of posting information about the length of the ith of the keywords accomplished by setting a bit in the logical word in said length-enabling table at the location identified by the one of said m keyword hash addresses corresponding to said length-recording index; and
(c) wherein said alarm sensing method consults said length-enabling table, said length-enabling table being addressed by the one of said sample hash addresses corresponding to said length-recording index.

3. A dictionary string matching method according to claim 1, wherein said step of computing m sample hash addresses is implemented in a recursive manner.

4. An apparatus for locating all matches of a keyword dictionary in a sample byte stream, comprising:
   (a) at least one primary testing means, each of said primary testing means further comprising:
      (i) a plurality m of n-gram hashers, each of which produces one of a plurality m of hash address streams from the sample byte stream, such that for each successive n-gram in the sample byte stream, one element in each of said plurality m of hash address streams is computed from the successive n-gram of the sample byte stream;
      (ii) a plurality m of hash tables, containing binary entries, prepared in advance from the n-gram contents of the keywords in the keyword dictionary, and connected such that each of said plurality m of hash tables accepts one of said plurality m of hash address streams and produces one of a plurality m of binary presence streams;
      (iii) for each distinct length of the keywords in the keyword dictionary, means of shifting each of said plurality m of binary presence streams producing a plurality m of shifted binary presence streams; and
      (iv) alarm sensing means, which, for each distinct length of the keywords in the keyword dictionary, operates on said plurality m of shifted binary presence streams to produce primary alarms; and
   (b) secondary testing means which, upon receiving one of said primary alarms, examines the sample byte stream for matches indicated by said one of said primary alarms, and issuing a match report if any of said matches are verified.

5. The apparatus for locating all matches of a keyword dictionary in a sample byte stream as recited in claim 4, wherein said alarm sensing means is further comprised of:
   (a) a plurality of AND gates, each of said plurality of AND gates producing a length-specific alarm signal, each of said plurality of AND gates corresponding to one of the distinct lengths of keywords in the keyword dictionary and driven by said plurality m of shifted binary presence streams corresponding to one of the distinct lengths of keywords in the keyword dictionary; and
   (b) means for producing one of said primary alarms when one or more of said length-specific alarm signals indicates an alarm.

6. The apparatus for locating all matches of a keyword dictionary in a sample byte stream as recited in claim 5, wherein:
   (a) a distinguished hash address stream is chosen from among one of said plurality m of hash address streams;
   (b) said alarm sensing means further comprises a length-enabling table addressed by said distinguished hash address stream, producing a length-enabling word stream; and
   (c) each one of said plurality of AND gates of said alarm sensing means is further driven by a bit stream derived from said length-enabling word stream.

7. The apparatus for locating all matches of a keyword dictionary in a sample byte stream as recited in claim 4, wherein each of said plurality of n-gram hashers is recursive, each producing an output that depends only upon its previous output, the current byte of the sample byte stream, and the byte n samples before in the sample byte stream.

8. The apparatus for locating all matches of a keyword dictionary in a sample byte stream as recited in claim 4, wherein a portion of the apparatus is implemented using gate arrays.

* * * * *